United States Patent
Sosna et al.

(10) Patent No.: US 10,831,851 B2
(45) Date of Patent: Nov. 10, 2020

(54) SYSTEM AND METHOD FOR CO-BROWSING

(71) Applicant: Veeva Systems Inc., Pleasanton, CA (US)

(72) Inventors: Arno Sosna, Pleasanton, CA (US); Timothy S. Murphy, Berkeley, CA (US); Cindy Chiang, Sunnyvale, CA (US); Ling Lam, Fremont, CA (US); Robert MacDonell, Pleasanton, CA (US); Hui Wang, Fremont, CA (US); Tao Dong, Fremont, CA (US)

(73) Assignee: VEEVA SYSTEMS INC., Pleasanton, CA (US)

( * ) Notice: Subject to any disclaimer, the term of this patent is extended or adjusted under 35 U.S.C. 154(b) by 455 days.

(21) Appl. No.: 14/611,012

(22) Filed: Jan. 30, 2015

(65) Prior Publication Data

US 2015/0149504 A1   May 28, 2015

Related U.S. Application Data

(63) Continuation-in-part of application No. 14/271,134, filed on May 6, 2014, now Pat. No. 9,055,023.

(60) Provisional application No. 61/820,029, filed on May 6, 2013, provisional application No. 61/828,034, filed on May 28, 2013.

(51) Int. Cl.
| | |
|---|---|
| *G06F 16/957* | (2019.01) |
| *H04L 29/08* | (2006.01) |
| *G06F 16/951* | (2019.01) |
| *H04L 12/18* | (2006.01) |
| *H04L 12/58* | (2006.01) |

(52) U.S. Cl.
CPC ......... *G06F 16/957* (2019.01); *G06F 16/951* (2019.01); *H04L 12/1818* (2013.01); *H04L 67/142* (2013.01); *H04L 51/18* (2013.01)

(58) Field of Classification Search
CPC ......... G06F 17/30899; G06F 17/30864; G06F 16/957
USPC ...................................................... 707/770
See application file for complete search history.

(56) References Cited

U.S. PATENT DOCUMENTS

| | | | | |
|---|---|---|---|---|
| 8,239,773 B1 * | 8/2012 | Billman | .................. | G06F 16/95 715/751 |
| 2002/0198941 A1 * | 12/2002 | Gavrilescu | ............ | G06F 16/954 709/205 |
| 2004/0075619 A1 * | 4/2004 | Hansen | .................. | G06F 3/1454 345/1.1 |

(Continued)

*Primary Examiner* — Joshua Bullock

(57) ABSTRACT

The co-browsing system described enables participants to share controlled content during a co-browsing session. A first participant's input on a web page may be collected and transferred to a second participant's computing device. The browser in the second participant's computing device, which is displaying the same web page, may receive the first participant's input and be manipulated by the first participant's input. Consequently, the participants may share a web-browsing experience while they jointly navigate web-related content at the same time, including the content and their activities on web pages, as if they are interacting with the web page on the same screen. Such controlled content co-browsing occurs in a system which has a repository of controlled content items and customer relationship management (CRM) information.

18 Claims, 17 Drawing Sheets

(56) References Cited

U.S. PATENT DOCUMENTS

| | | | | |
|---|---|---|---|---|
| 2005/0097159 A1* | 5/2005 | Skidgel | ............... | G06F 16/954 |
| | | | | 709/200 |
| 2008/0276184 A1* | 11/2008 | Buffet | ................... | G06Q 10/10 |
| | | | | 715/752 |
| 2009/0164581 A1* | 6/2009 | Bove | ..................... | G06F 16/954 |
| | | | | 709/205 |
| 2011/0202854 A1* | 8/2011 | Chan | ..................... | G06F 3/1454 |
| | | | | 715/762 |
| 2013/0091205 A1* | 4/2013 | Kotler | ................ | H04L 65/4015 |
| | | | | 709/204 |
| 2013/0290863 A1* | 10/2013 | Chen | ..................... | G06Q 10/10 |
| | | | | 715/747 |

\* cited by examiner

Cancel | Professional Information | Call Report | Media | Sign

| | Datetime | 5/1/2013 2:27 PM | Signature Date | |

Call Type

Save
Submit
Send email
Co-browse

720

Account Type
Business Acc
Person Accou
Account Lists

Detailing Priority

Approved E

Common (0)
☐ Anvil
☐ Coldcap_Jap   ☐ Lab #2
☐ Market_2_Product_0   ☐ Restalot   ☐ Chat_Lab
☐ Market_0_Product_0
☐ Restalotmor Prod_grp2 (2)
☐ My Other Detail Topic   ☐ Supero   ☐ Anvil
☑ Coldcap_tst
☑ Labyrinth TimTst2-DetlGrp (3)
☑ My Detail Topic   ☐ My Other Detail Topic
☑ Anvil   ☐ Labyrinth   ☐ Nilbrack

710

A B C D E F G H I J K L M N O P Q R S T U V W X Y Z #

US 10,831,851 B2

SYSTEM AND METHOD FOR CO-BROWSING

CROSS-REFERENCE TO RELATED APPLICATIONS

The present application is a continuation-in-part of U.S. nonprovisional patent application Ser. No. 14/271,134, filed on May 6, 2014, entitled System and Method for Controlling Electronic Communications, which claims priority to provisional patent application nos. 61/820,029, filed May 6, 2013 and 61/828,034, filed May 28, 2013, both entitled "System and method for controlling electronic communications." All of these provisional and nonprovisional patent applications are hereby incorporated by reference herein for all purposes.

TECHNICAL FIELD

The present application relates generally to sharing controlled content, and more specifically to sharing controlled content in a web-browsing session.

BACKGROUND

Users of computing devices often need to share their screens with users at remote locations, especially during a customer support session, business presentation, teleconference or product demo. Some teleconference systems allow users at different locations to share their screens by transferring screen images to each other, but their user experience is often affected by delays in response time and degradation in quality of displayed screens.

SUMMARY

Embodiments disclosed in the present document provide a machine-implemented method for co-browsing. The method comprises: establishing a controlled content repository, the controlled content repository being securely and controllably accessed; establishing an access protocol for the controlled content repository, whereby approved content is stored in the controlled content repository according to the access protocol and whereby the access protocol comprises at least one set of alignment rules for determining if a first item of approved content within the controlled content repository can be made available to a first participant and a second participant via co-browsing; storing the approved content within the controlled content repository, the approved content further being accessible according to the established access protocol; aligning the approved content within the controlled content repository with information from an information management system; collecting a first participant input on the first item of approved content displayed in a first browser, wherein the first participant input is used to manipulate the first browser to generate a first screen; and transferring the first participant input to a second browser over a network.

BRIEF DESCRIPTION OF THE DRAWINGS

For a more complete understanding of the present application and its advantages, reference is now made to the following description taken in conjunction with the accompanying drawings, in which like reference numbers indicate like features.

FIG. 7 illustrates a screenshot showing one embodiment of a user interface for generating a co-browsing session;

Although similar reference numbers may be used to refer to similar elements for convenience, it can be appreciated that each of the various example embodiments may be considered to be distinct variations.

Figure 1:
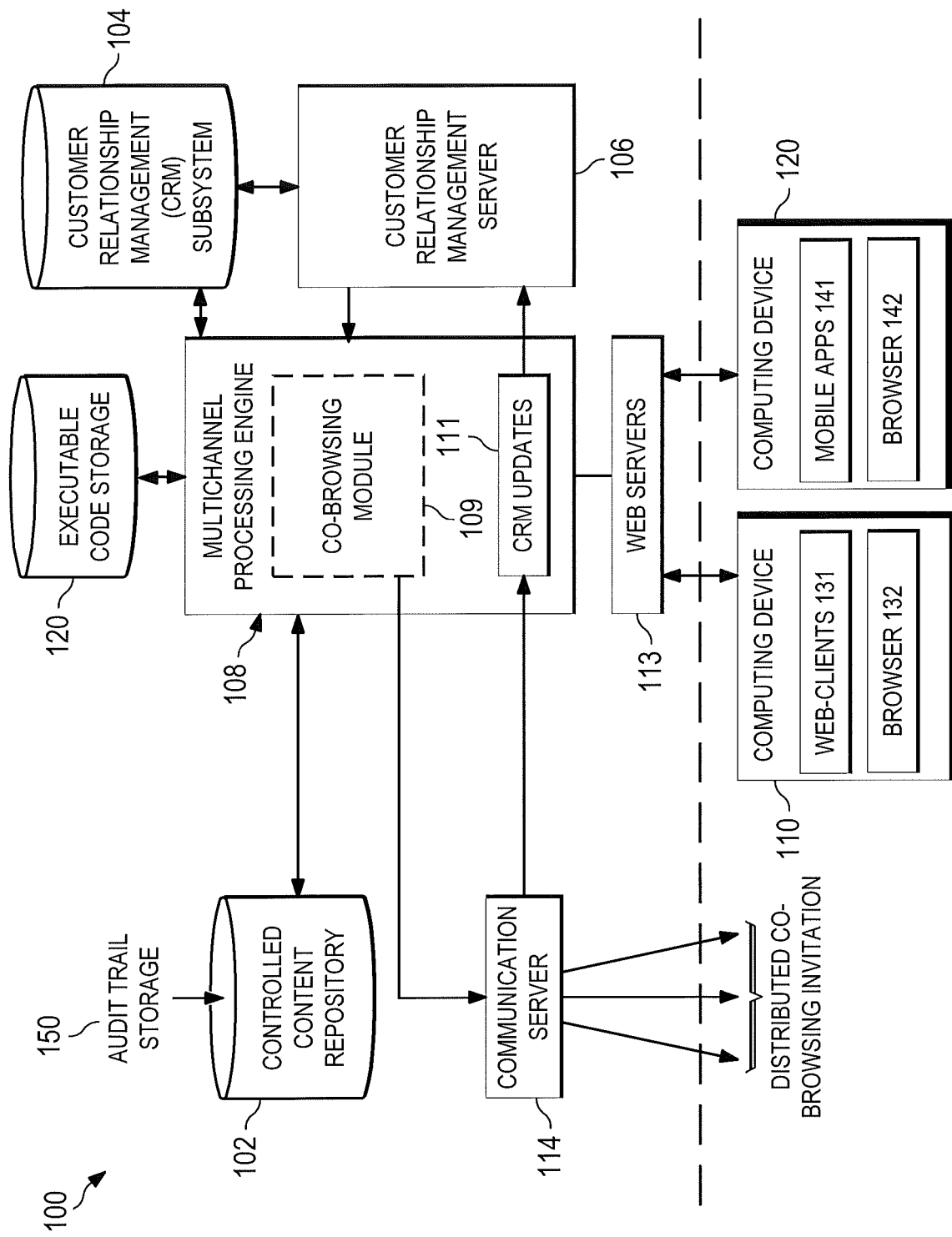
FIG. 1 is a system overview illustrating an embodiment of a co-browsing system 100.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Embodiments disclosed in the present application enable system users and customers to co-browse web pages for controlled content.

During a co-browsing session, a first participant's input on a web page may be collected and transferred to a second participant's computing device. The browser in the second participant's computing device, which is displaying the same web page, may receive the first participant's input and be manipulated by the first participant's input. Consequently, the participants may share a web-browsing experience while they jointly navigate web-related content at the same time, including the content and their activities on web pages, as if they are interacting with the web page on the same screen.

Such controlled content co-browsing occurs in a system which has a repository of controlled content items and customer relationship management (CRM) information including customer profile information and parameters including customer preferences and regulatory limitations or fields that can be used to facilitate compliance with regulatory limitations. A unique invitation for each participant of a co-browsing session may be pre-generated with a pointer to the controlled content in the repository and then aligned with various customer attributes such as regulatory limitations, customer preferences and demographic information in order to ensure compliant and tailored communication.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

FIG. 1 is a system overview illustrating an embodiment of a co-browsing system 100 according to the present application. The presently disclosed embodiment comprises a controlled content repository 102, a Customer Relationship Management (CRM) server 106, and a multichannel processing engine 108. The customer relationship management server 106 may provide access to a customer relationship management subsystem 104, and the multichannel processing engine 108 may be coupled to a communication server 114. The communication server 114 may be an email server, a Short Message server, or an Instant Message server. In one embodiment, the customer relationship management subsystem 104 and/or the communication server 114 may be operated by a third party. The multichannel processing engine 108 may be accessed by system users such as company sales representatives through web clients 131 in a computing device 110 or through mobile apps 141 (such as iOS, Android, Blackberry, or Windows Mobile systems) in a computing device 120, communicating with the multichannel processing engine 108 through web servers 113. Although the system users may be described in the present application as being company sales representatives, this particular described embodiment is not intended to limit the generality of the claims that may eventually issue in patents stemming from the present disclosure.

The controlled content repository 102 is designed to have a process for developing controlled or approved content that is sharable across multiple users, such as shareholders, reviewers, managers, marketing personnel, sales representatives, etc. The content generated in the controlled content repository 102 may be accessed on a regulated basis, and shared with customers during a co-browse session. This regulated basis may be determined, in part, by the company as a whole and additionally by interaction with data from the customer relationship management subsystem 104, described in further detail below. In one embodiment, controlled content, customer profile information, customer preferences, and regulatory limitations and requirements may be stored in a table in the controlled content repository 102. In addition to storage and development of content, the controlled content repository 102 may also store an audit trail, tracking exact content shared by the user, as well as metadata about the co-browsing session and information regarding the content accessed by customers.

The customer relationship management subsystem 104 contains all contact information that may be available to users. In addition to storage of contact information, the customer relationship management subsystem 104 may also be capable of storing configurations regarding specific preferences, regulatory limitations and requirements, and other fields that will facilitate the co-browsing of the controlled content, in general or on a by-recipient basis. These preferences and/or requirements include both the preferences of the system user (e.g., maintaining account lists) as well as the preferences of the enterprise (e.g., employers of the system users), discussed in further detail below. In some examples, the controlled content may be pre-processed and stored in the controlled content repository 102 and provided to the multichannel processing engine 108 during a co-browsing session. In other examples, the customer relationship management subsystem 104 may have a content management subsystem and may provide the controlled content.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatability with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data and to use that coordinated data for co-browsing in accordance with the system described herein.

Within the customer relationship management subsystem 104, customer accounts may be assigned a set of alignment rules which determine specific pieces of content that are available for use from the controlled content repository 102. In addition, the customer relationship management subsystem 104 may include a pointer to the controlled content repository 102 for each of the specific pieces of content that are available for use.

In one implementation, the content in the controlled content repository 102 may be published to the Content Delivery Network ("CDN") so that the content can be served faster. Thus, instead of accessing the content from the controlled content repository 102 which may be at a remote location, the browsers may get the content from the CDN, as a global cache.

In one implementation, the customer relationship management server 106 may receive from a system user via the multichannel processing engine 108 a request for a co-browsing session for sharing a piece of content with one or more customers. The customer relationship management server 106 may access the customer account information from the customer relationship management subsystem 104, apply the alignment rules to align the customer account information with content available from the controlled content repository 102, and generate an identifier of the co-browsing session, which may be a link including a Uniform Resource Locator ("URL") pointing to a piece of content in the controlled content repository 102 approved to be displayed to the customer. The customer relationship management server 106 may send to the multichannel processing engine 108 the identifier of the co-browsing session and identification information of each participant approved to view the piece of content to be shared during the co-browsing session. The multichannel processing engine 108, or more specifically, the co-browsing module 109, may generate a unique security token for each participant, and add it to the identifier of the co-browsing session to generate a unique invitation for each participant for accessing the co-browsing session. The invitations may then be sent to the communication server 114 to be distributed to the participants, including the system user and the customers.

When the system user and at least one customer open their invitation links and the co-browsing session is active, a first participant's action on the web page for the piece of content shared may be collected by a co-browsing module 109 in the multichannel processing engine 108. The co-browsing module 109 in the multichannel processing engine 108 may then forward the first participant's action to a second participant's computing device 120, more specifically a browser 142. The browser 142 in the second participant's computing device may then be manipulated by the first participant's action. Similarly, the second participant's action may be collected and transferred to the first participant's computing device 110 via the multichannel processing engine 108 and then manipulate the browser 132 in the first participant's computing device 110 in real time. The first and second participants could be the system user or a customer, and a participant could be a presenter at one time, and a viewer at another.

The multichannel processing engine 108 may collect audit trail data 150 which documents and retains information that may include, but is not limited to, participant information, participants' actions, time stamp data, and any content shared during the co-browsing session, and store the audit trail data 150 in the controlled content repository 102 or the multichannel processing engine 108. As shown in FIG. 1, the multichannel processing engine 108 may also send the data through the customer relationship management server 106 to the customer relationship management subsystem 104, as CRM updates 111, to be included in the customer account profile. The invitations sent may also be stored in the customer relationship management subsystem 104.

The co-browsing module 109 in the multichannel processing engine 108 may be implemented by, e.g., JavaScript. In one implementation, the JavaScript code may be embedded in a web application and stored in the executable code storage 120.

The multichannel processing engine 108 may be controlled by executable code computer instructions stored in executable code storage 120. The executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

The multichannel processing engine 108 may communicate with the customer relationship management subsystem 104 directly or through the customer relationship management server 106, which acts as an interface between the two. The customer relationship management server 106 may act as an entry and exit point for the customer relationship management subsystem 104. The user may access the multichannel processing engine 108 through either a Web Client 131 or through the mobile apps 141 (such as iOS, Android, Blackberry, or Windows Mobile systems).

Figure 2:
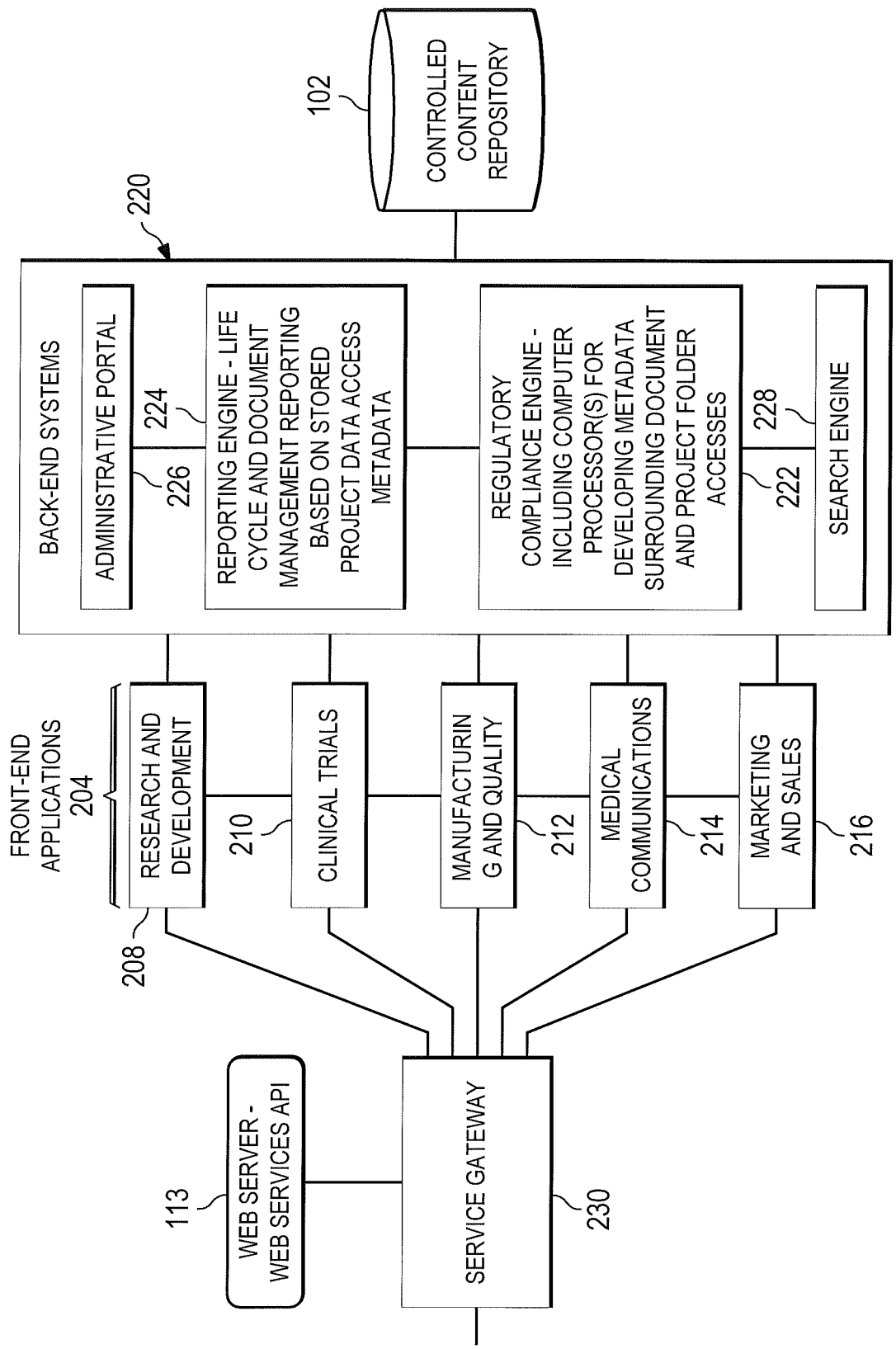
FIG. 2 illustrates an example architecture for the content repository of FIG. 1 in which content is built and organized in a controlled manner that facilitates efficient content generation.

FIG. 2 provides a description of the controlled content repository 102 with additional specific applications and interfaces connected thereto. In an embodiment, this controlled content repository 102 is a cloud-based or distributed network based system for consolidating an enterprise's data, oftentimes integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204:

The Research & Development (R&D) front end application 208 provides for an aggregation of materials in support of research and initial clinical trial submissions through building organized and controlled content repositories within the controlled content repository 102. Elements that can be stored, organized, and managed through this front end include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the controlled content repository 102.

In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 122 may further includes prevalidation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching.

In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the co-browsing system 100 such that particular features are usable within the various user screens. For example, and without limitation to any other possible combination of features, in the below-described description of co-browsing, the above-described search portal can be used to search the controlled content repository 102 for content to be displayed during a co-browsing session. And the synergy of combining these particular systems is that the generation of the controlled content can be done in a controlled fashion such that the approved content can be displayed to customers with greater confidence in the integrity of the data being sent.

Figure 3:
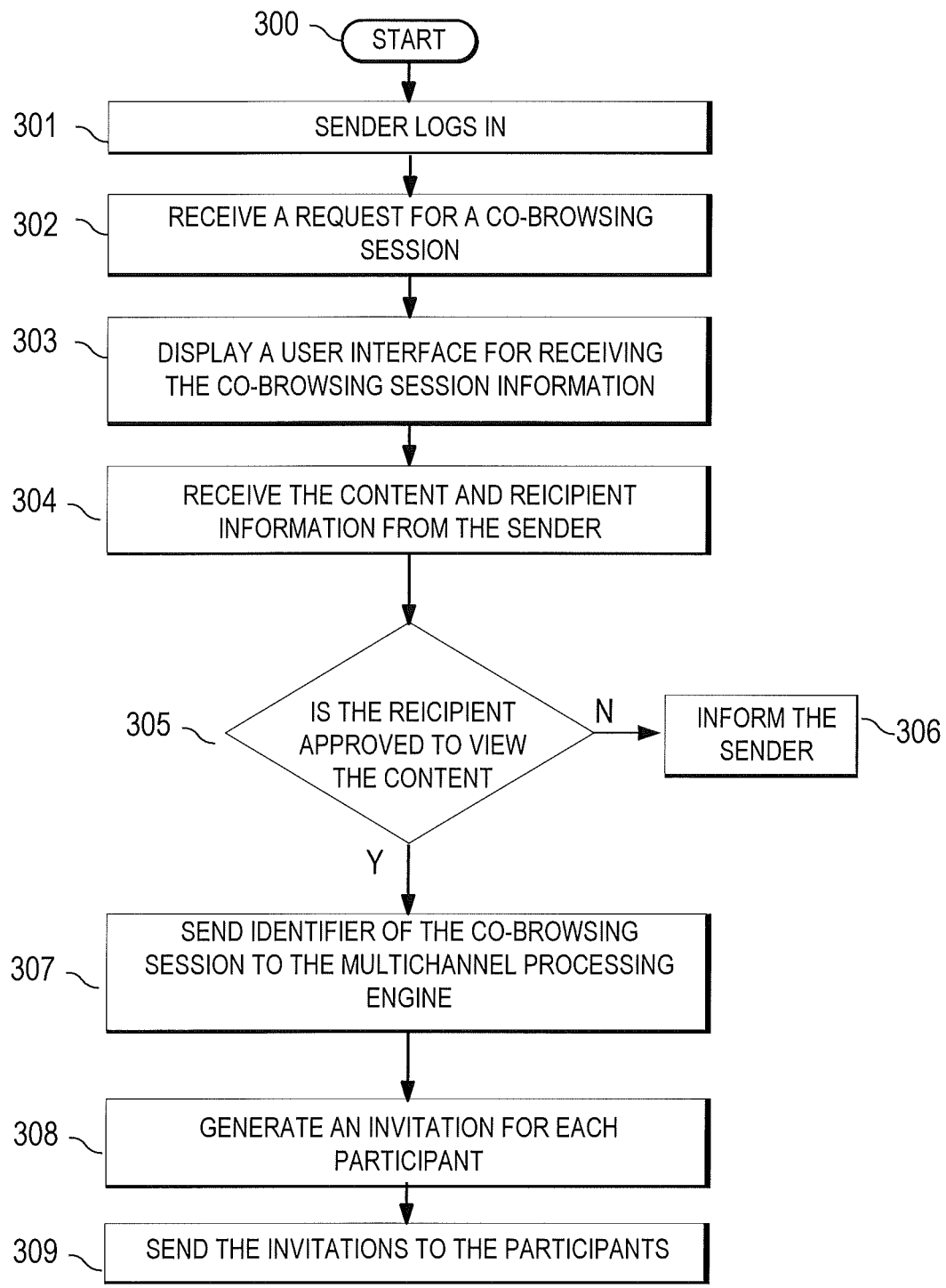
FIG. 3 is a flowchart illustrating the generating of a co-browsing session in accordance with embodiments disclosed in the present application.
Figure 4:
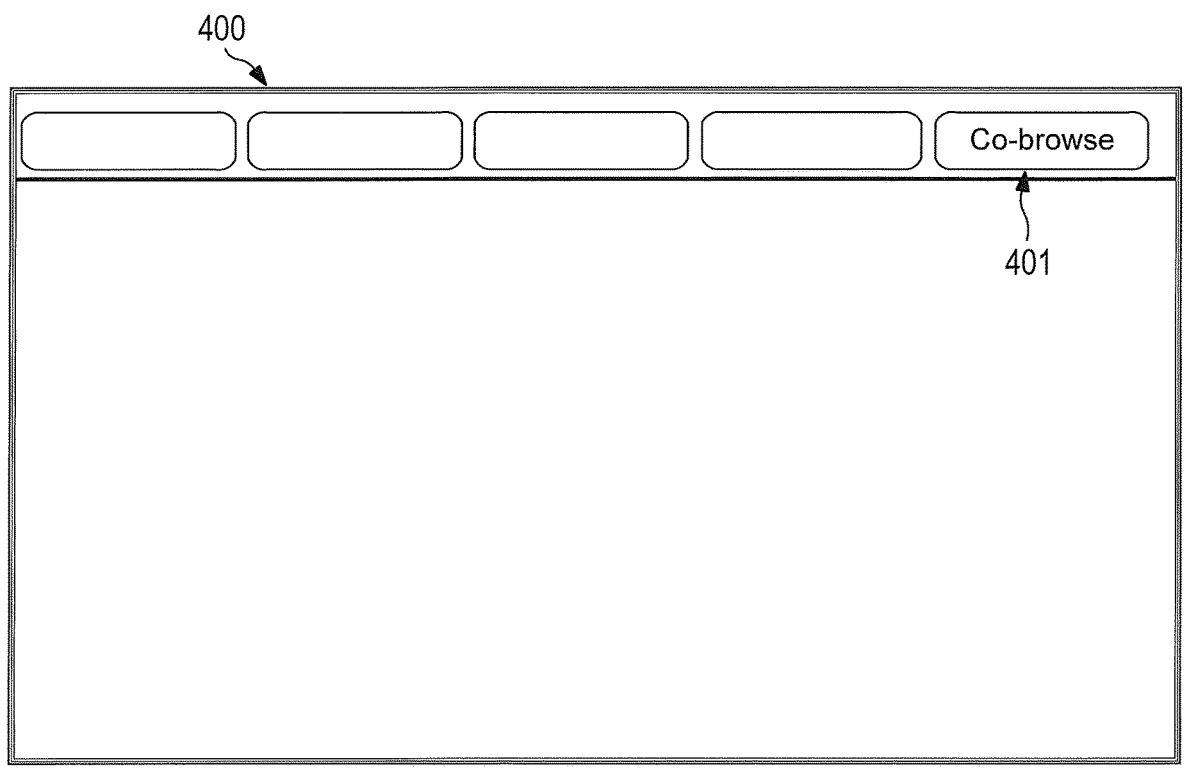
FIG. 4 illustrates a screenshot showing one embodiment of a user interface for generating a co-browsing session.
Figure 5:
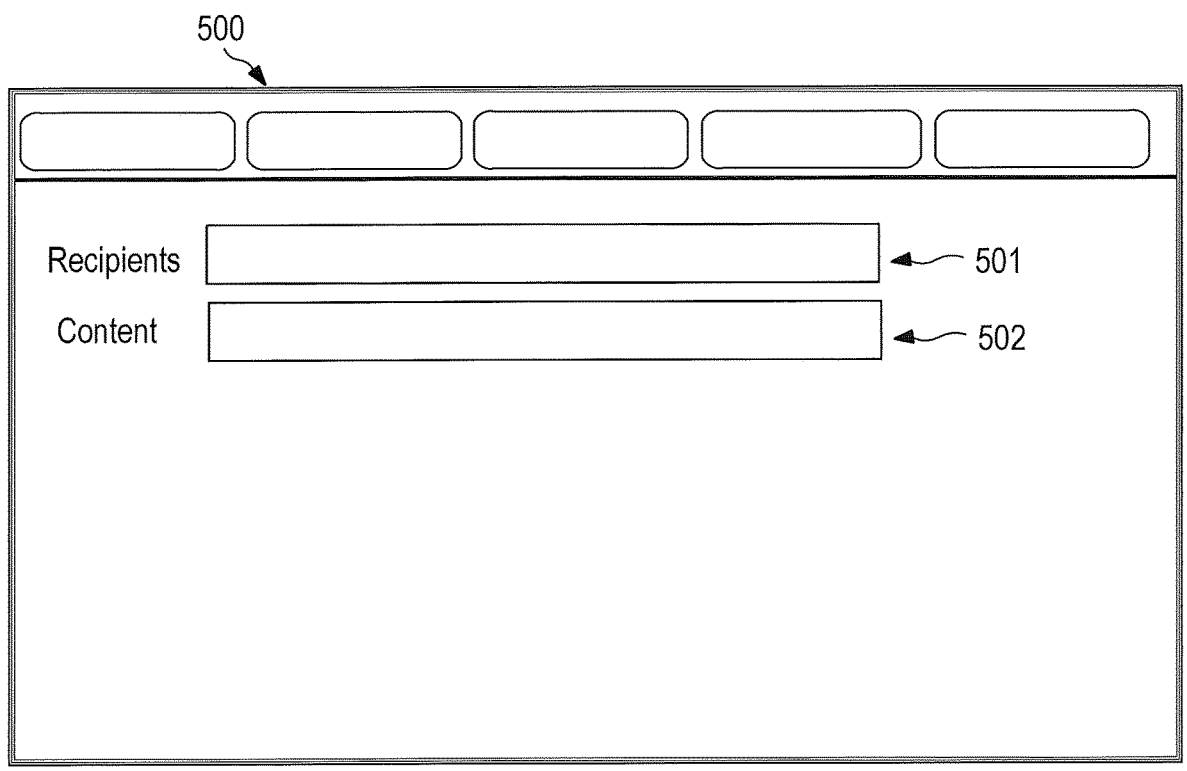
FIG. 5 illustrates a screenshot showing one embodiment of a user interface for generating a co-browsing session.

FIG. 3 is a flowchart illustrating the generating of a co-browsing session in accordance with embodiments disclosed in the present application, and FIGS. 4 and 5 each illustrates a screenshot showing one embodiment of a user interface for generating a co-browsing session. The process may start at 300.

At 301, the system user, or sender, may log into his/her account for the customer relationship management subsystem 104 or a web application based on the customer relationship management subsystem 104.

At 302, the sender may click on a "Co-browse" button 401 on a user interface 400 shown in FIG. 4 for, e.g., the customer relationship management subsystem 104 or a web application based on the customer relationship management subsystem 104, to request for a co-browsing session.

At 303, a user interface 500 for receiving the co-browsing session information may be displayed in response, as shown in FIG. 5. The user interface 500 may have an input area 501 for the sender to add recipients, which could be another system user or one or more customers, and an input area 502 for the sender to add a content item to be shared during the co-browsing session. In one implementation, the content item may be selected from a list of approved content from within the controlled content repository 102 that has been aligned with the customer information from the customer relationship management subsystem 104.

At 304, sender inputs may be received at areas 501 and 502.

At 305, the customer relationship management subsystem 104, which stores profile information and a pointer to the content to be shared in the controlled content repository 102, may check profiles of all participants, including the sender and the recipients, and determine if they are approved to view the content item to be shared.

If a participant is not approved to view the content item to be shared, the sender may be informed at 306, so that he can change the content and/or the recipients. A warning may be displayed to indicate that one or more of the selected participants may be restricted from viewing the content item to be shared. This warning is generated from information contained within the customer relationship management subsystem 104. Warnings may appear for reasons that include, but are not limited to, regulatory limitations, customer preferences, demographic information, a customer "opt-out" option where the customer has requested to not have the content shared; the absence of a customer "opt-in" option where the customer may not receive the co-browsing invitation without prior approval; or that the most current information contained within the customer account profile no longer allows access to the current content delivered by the controlled content repository 102. Information regarding regulatory limitations, customer preferences, demographic information, the "opt-in" or "opt-out" status of individual customer accounts is stored within the customer relationship management subsystem 104.

If the sender and at least one recipient are approved to view the content item to be shared, at 307, the customer relationship management subsystem 104 may send to the multichannel processing engine 108 the identifier of the co-browsing session and the identification information of the approved participants. In one implementation, the identifier of the co-browsing session may be the URL for the content to be shared.

At 308, with the identifier of the co-browsing session and the identification information of the approved participants from the customer relationship management subsystem 104, the multichannel processing engine 108 may generate a unique security token for each participant, and add the security token to the identifier of the co-browsing session to generate a unique invitation for each participant. In one implementation, the invitation may be a link. In one example, the sender link (e.g., https://c.vod123.com/Qrt456) may include the URL for the content item in the customer relationship management subsystem 104 (e.g., https://c.vod123.com) and a security token unique to the sender (i.e., Qrt456). A recipient link (e.g., https://c.vod123.com/abcde12345) may include the URL for the content item in the customer relationship management subsystem 104 (e.g., https://c.vod123.com) and a security token unique to the recipient (e.g., abcde12345).

At 309, the multichannel processing engine 108 may send to each participant his/her unique invitation link for the co-browsing session. The invitation links may be sent with any channel, e.g., Short Message, Instant Message, Twitter, WeChat or email. In one implementation, the invitation links may be sent via an approved email described in U.S. patent application Ser. No. 14/271,134. The invitation links may also be sent via phone. To make communicating and typing via phone simpler, the security token may include numeric digits only, e.g., 1234567890, instead of abcde12345 shown above.

When a first participant, which could be the sender or a recipient, opens his/her unique invitation link, he/she is added to the co-browsing session and the content item is displayed in a browser window on his/her computing device. When a second participant opens his/her invitation link, he/she is added to the same co-browsing session and the same content item is displayed in a browser window on his/her computing device too. The two participants can then start to co-browse.

Figure 6A:
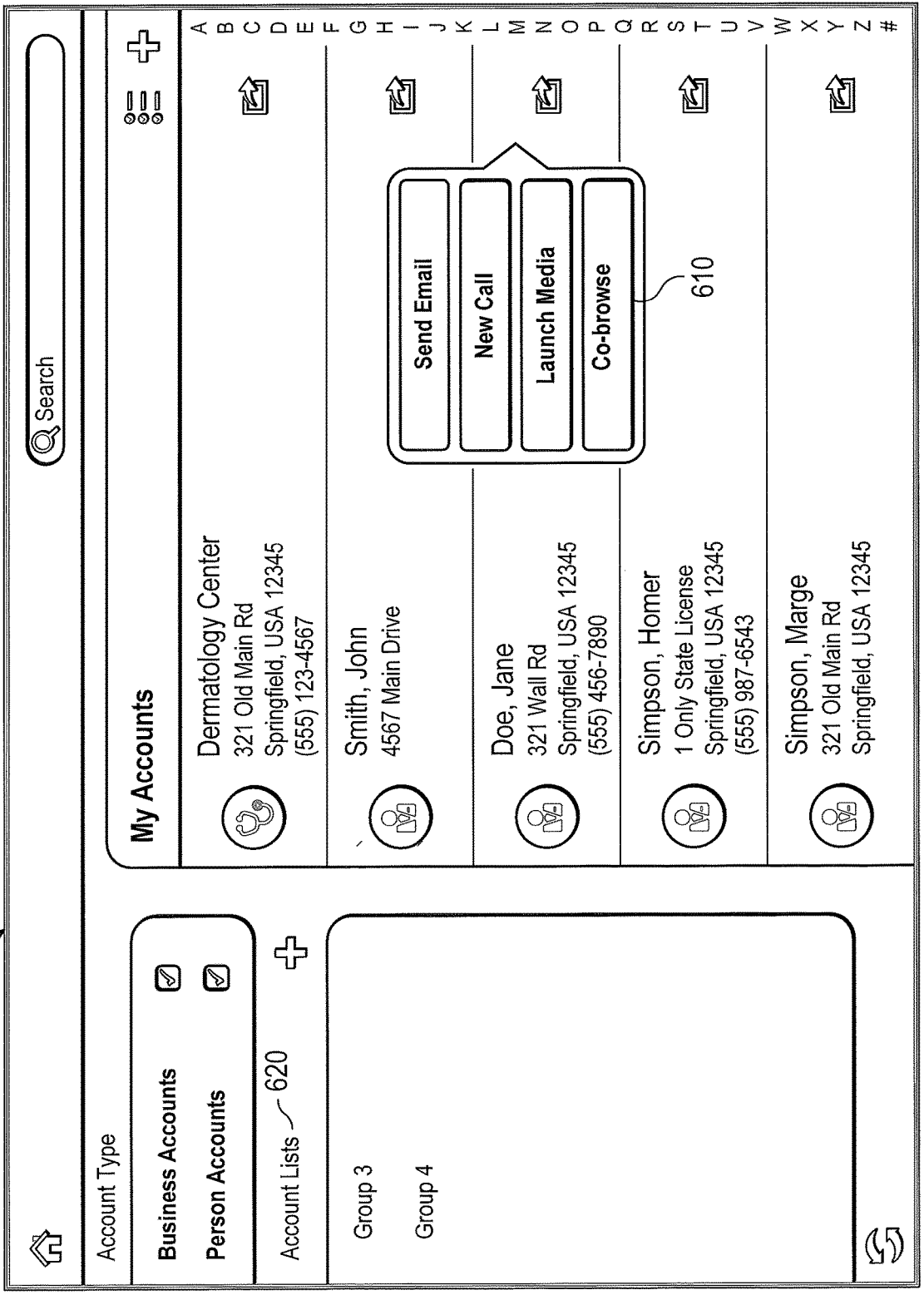
FIGS. 6a and 6b each illustrates a screenshot showing one embodiment of a user interface for generating a co-browsing session.

FIG. 6a illustrates a screenshot of a user interface for generating a co-browsing session in accordance with embodiments disclosed in the present application. As shown, the sender may request a co-browsing session from a "My Accounts" interface 600 in the web-based or mobile application 131, 141. The sender may select an individual account from an account list 620, which is a list of existing physician or other clinical accounts within the customer relationship management subsystem 104. By selecting a specific individual account from the "My Accounts" screen 600, the sender can be taken to a screen containing current contact information for the selected account as stored in the customer relationship management subsystem 104. From this screen, the sender may request a co-browsing session with the selected account by selecting a "Co-browse" link on the screen. In this embodiment, there are additional options within the web-based or mobile application 131, 141 for generating a co-browsing session. From the "My Accounts" screen 600 shown in FIG. 6a, the sender may also click on or mouse over the "Action" sheet shown in this embodiment to the right of the contact name to get a pop-up window and select a "Co-Browse" link 610 in the pop-up window. A user interface may be displayed for the sender to add the content item to the shared. The process may proceed to 305 after receiving the content information.

Figure 6B:
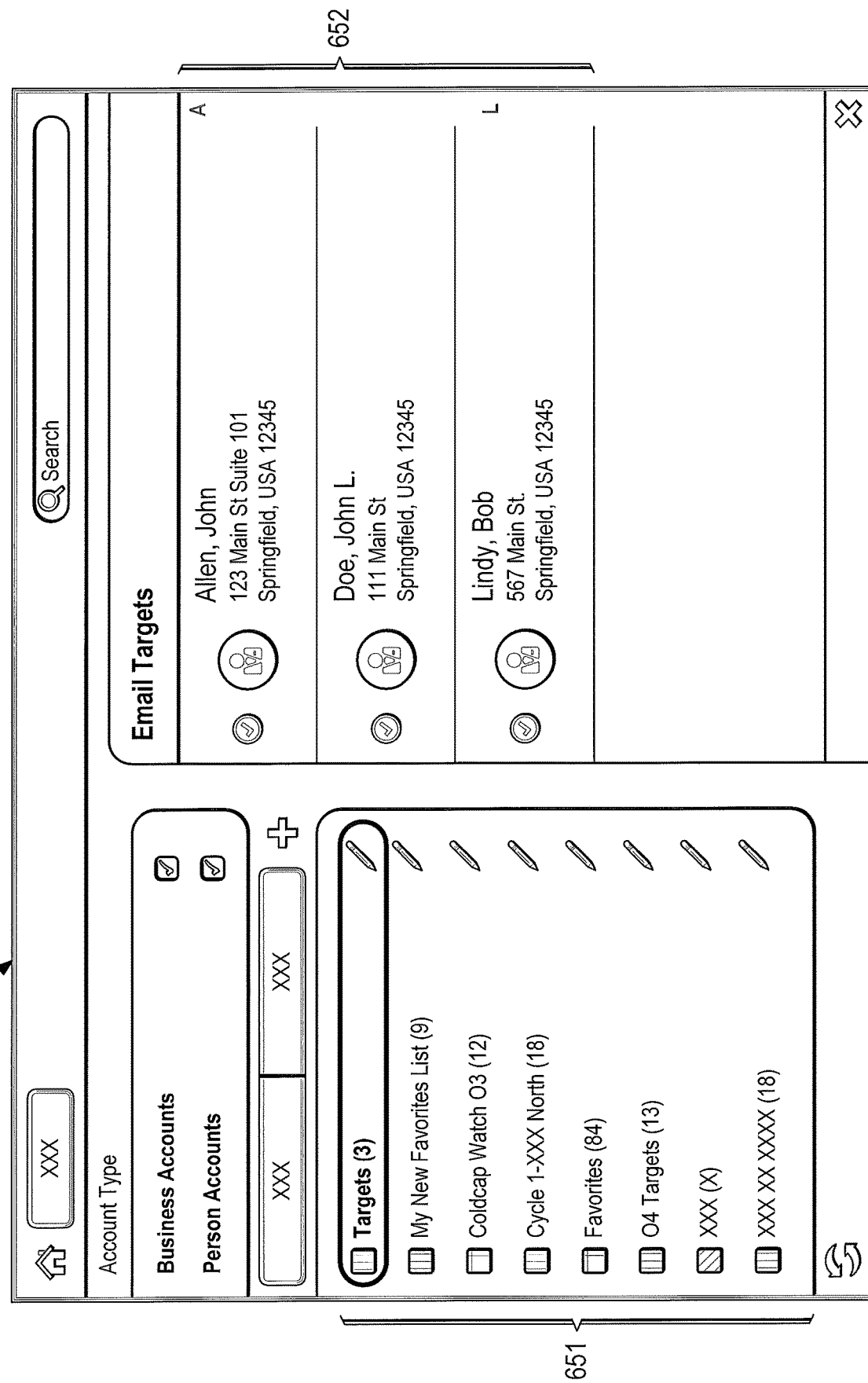

Referring now to FIG. 6b, by selecting the "Account Lists" 620 on the left hand side of the screen in FIG. 6a, users may access personally or institutionally pre-constructed lists 651 of individual customers as configured in the customer relationship management subsystem 104. From this screen 650, the user may also select a number of individual customer accounts 652 with whom he wishes to co-browse. Once desired customers have been selected from the list, which could include the selecting of all customers in the list, the user may begin requesting a co-browsing session with the selected customers. The co-browsing invitation may be constructed within the customer relationship management subsystem 104, which communicate with the browsers 132 and 142 via the multichannel processing engine 108, and can access content provided by the controlled content repository 102 which has been aligned with the customer information provided by the customer relationship management subsystem 104.

A sender may also request a co-browsing invitation from a content page, e.g., when the sender is viewing a document or a video on his screen. FIG. 7 illustrates an embodiment screenshot 700 of a "Call Report" interface in a web-based or mobile interface within a web-based system 131 or mobile system 141 (see FIG. 1). While viewing a Call Report 710 on screen 700, the sender may decide to share content related to some topics in the Call Report. The sender may click on or mouse over the "Action" sheet next to the "Sign" link shown in this embodiment to get a pop-up window and then select a "Co-browse" link 720 in the pop-up window. A user interface may be displayed for the sender to select recipients. The process may proceed to 305 after receiving the recipient information. Because the described system including the controlled content repository 102 provides for a coherent and controlled access to the controlled content, it can be made quite flexible as to providing consistently formatted and approved content from various applications and/or specific screenshots within applications.

Figure 8:
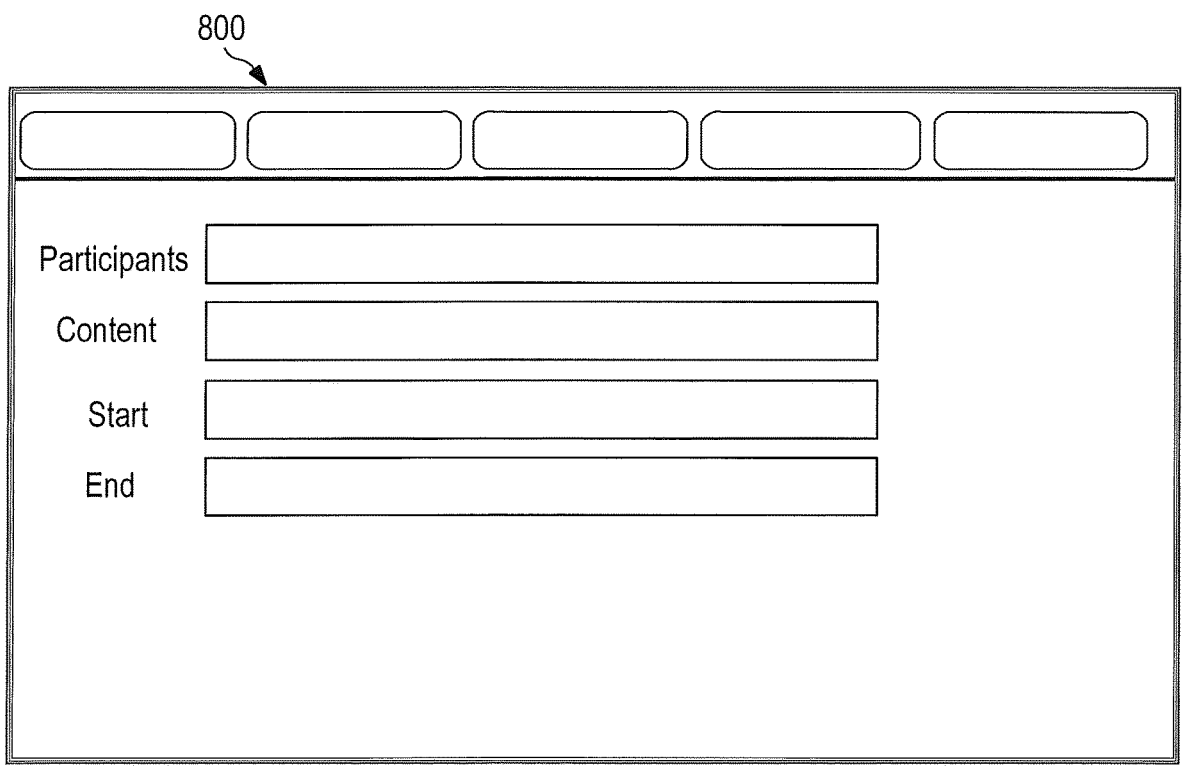
FIG. 8 illustrates a screenshot showing one embodiment of a user interface for generating a co-browsing session.

The sender may also request a co-browsing session from his calendar or send the invitation for the co-browse session via a meeting request. As shown in FIG. 8, the sender may input information about recipient(s), start and end time, and the content item to be shared on the screen 800. After the user sends or saves the meeting request, a meeting including a sender link for the co-browsing session may be saved to the sender's calendar, and each recipient may receive his/her unique invitation link in his/her calendar.

Figure 9:
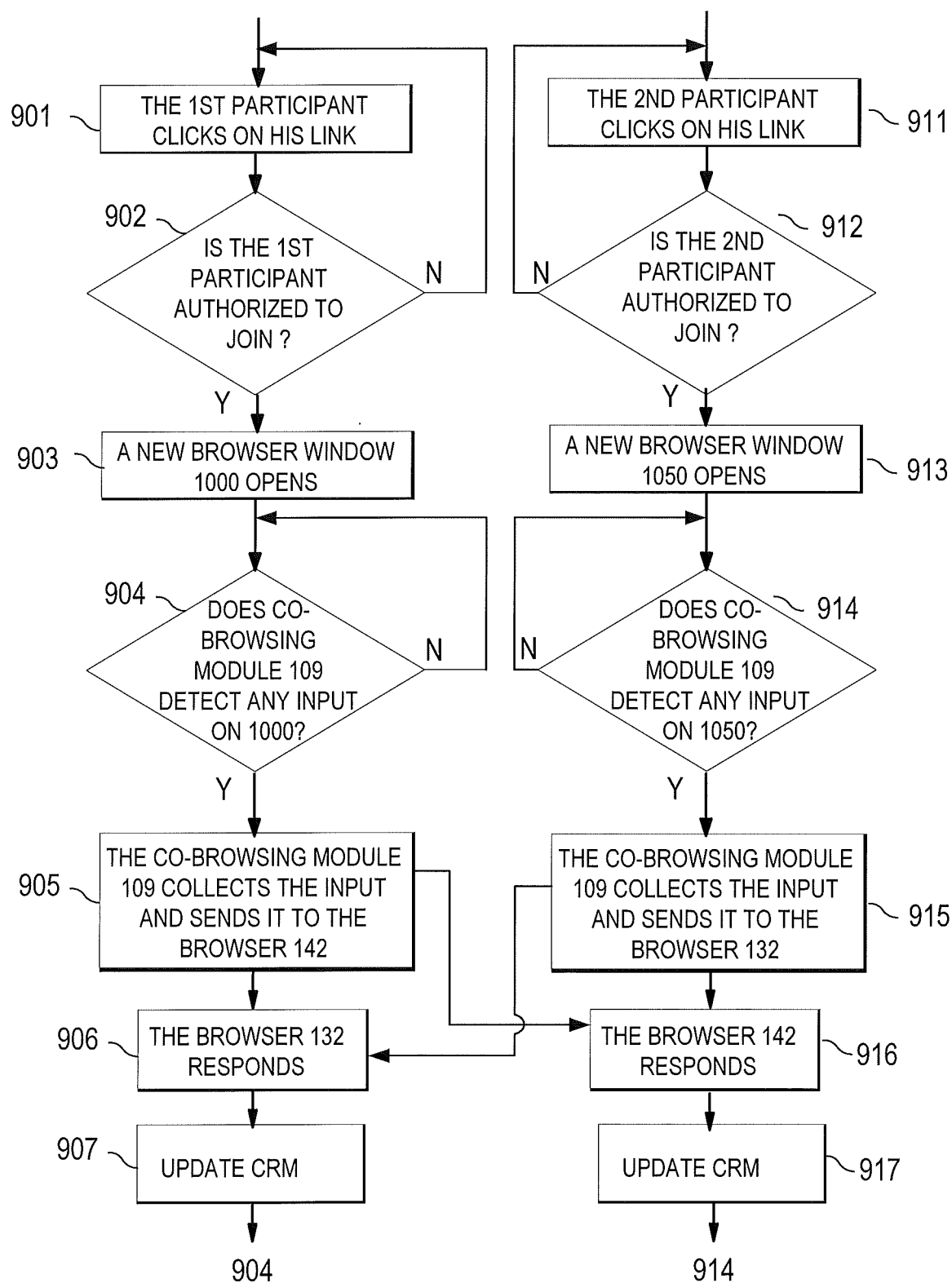
FIG. 9 illustrates a flowchart of a method for managing a co-browsing session.

FIG. 9 illustrates a co-browsing session in accordance with the embodiments disclosed in the present application, and FIGS. 10a, 10b, 11a, 11b, 12a and 12b illustrate screenshots of user interfaces within the web client 131 or the mobile app 141 during the co-browsing session.

At 901, a first participant may click on his/her link for the co-browsing session, which may be either the sender opening the sender link, or a recipient opening a recipient link. As discussed above, the sender or recipient may open their links for the co-browsing session by clicking on a link in a Short Message, an Instant Message, an email or a calendar event.

At 902, it may be determined, e.g., by the customer relationship management system 104, if the first participant is authorized to join the co-browsing session. In one implementation, the first participant's ID and the security token in his invitation for the co-browsing session may be checked to determine if he is authorized to join.

If not, the first participant may be informed and the process may return to 901.

Figure 10A:
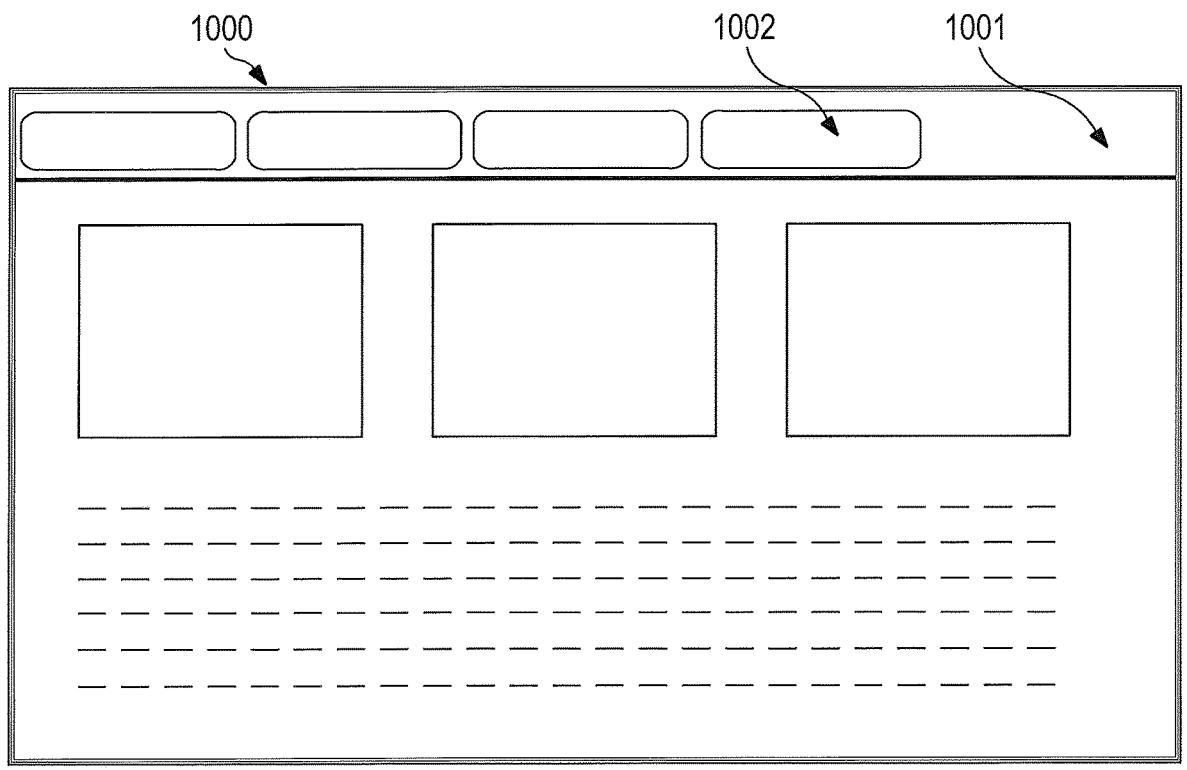
FIGS. 10a and 10b each illustrates a screenshot showing one embodiment of a user interface during a co-browsing session.
Figure 10B:
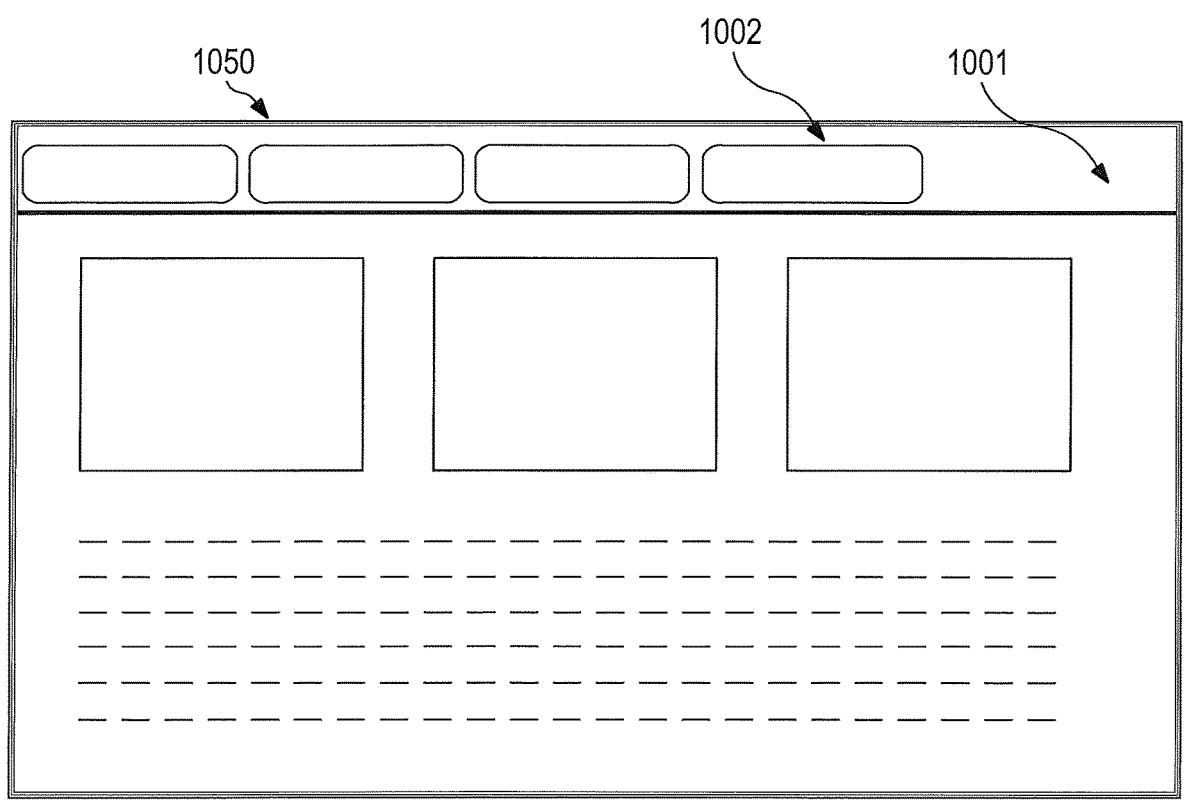
Figure 11A:
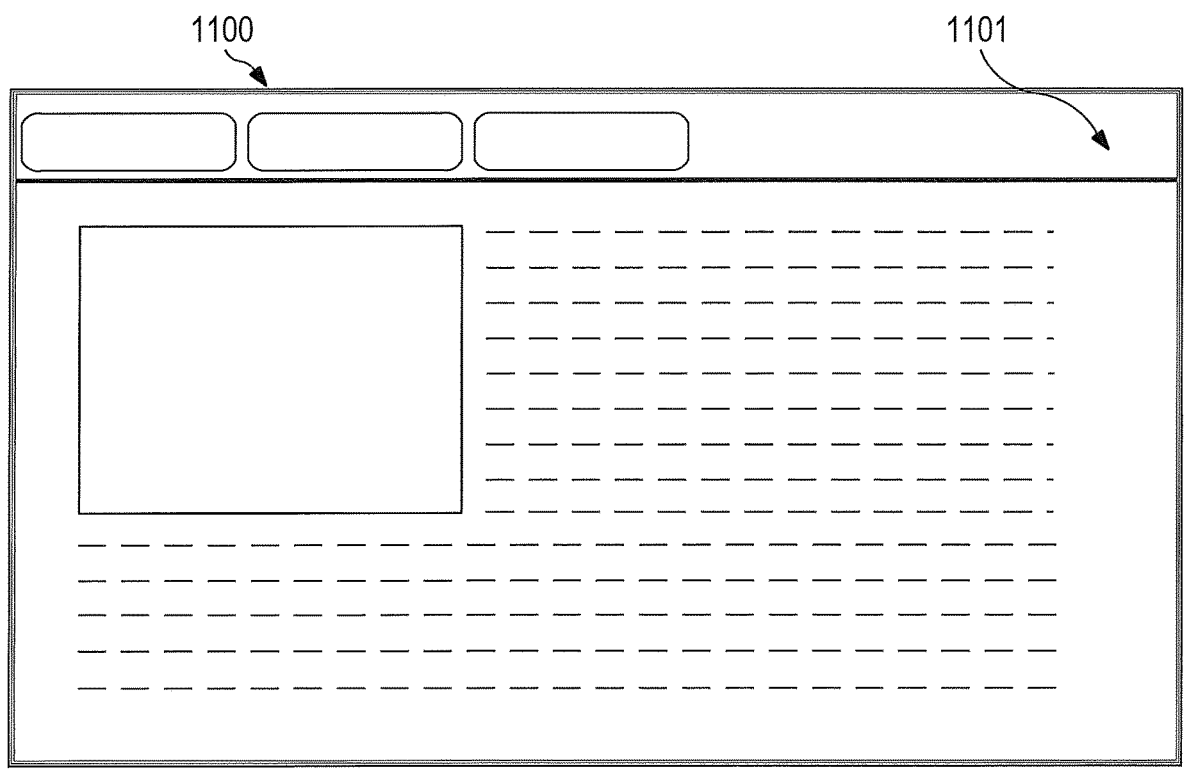
FIGS. 11a and 11b each illustrates a screenshot showing one embodiment of a user interface during a co-browsing session.
Figure 11B:
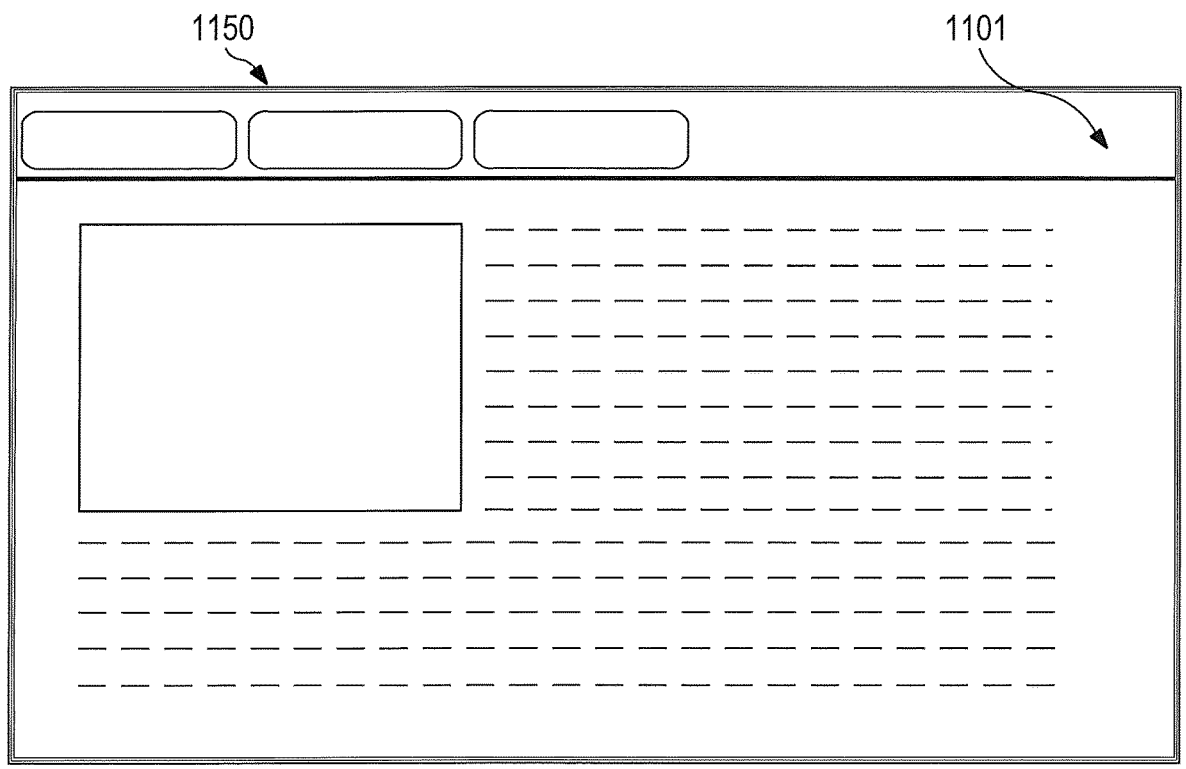

If the first participant is authorized to join the co-browsing session, at 903, a new browser window 1000, as show in FIG. 10a, may be opened to display a web page 1001, the content item of the co-browsing session, on the screen of the first participant's computing device 110.

At 911, a second participant may click on his invitation link for the co-browsing session.

At 912, it may be determined, e.g., by the customer relationship management system 104, if the second participant is authorized to join the co-browsing session. In one implementation, the second participant's ID and the security token in his link for the co-browsing session may be checked to determine if he is authorized to join.

If not, the second participant may be informed and the process may return to 911.

If the second participant is authorized to join the co-browsing session, he may be added to the co-browsing session. Either the first participant or the second participant is the sender. A new browser window 1050, as show in FIG. 10b, may be opened to display the web page 1001, the content item of the co-browsing session, on the screen of the second participant's computing device 120. Thus, the first participant and the second participant independently go to the same content item, or the web page 1001, with their different browsers 132 and 142 respectively.

More participants may join the co-browsing session.

At 904, participant input on browser windows 1000 and 1050 may be monitored, e.g., by the co-browsing module 109. The participant input may be mouse movements, keyboard input, keypad input, styles input, or touch gestures.

When a first participant input is received on the browser window 1000, at 905, it may be captured by the co-browsing module 109 in the multichannel processing engine 108, and sent to the browser 142 in the second participant's computing device 120.

At 906, the browser 132 in the first participant's computing device 110 may respond to the first participant input. In one example, the first participant input is a click on a button 1002 on the web page 1001, and the browser 132 may navigate to the corresponding page 1101, as show in FIG. 11a.

Meanwhile, at 916, the browser 142 in the second participant's computing device 120 which receives the first participant input from the co-browsing module 109 may respond, as if the first participant input is received locally. For example, when the first participant input from the browser 132 in the first participant's computing device 110 is, e.g., a click on the button 1002 in the browser window 1000 shown in FIG. 10a, the click may be displayed on the web page 1001 in the browser window 1050, and the browser 142 may navigate to the corresponding web page 1101 from the web page 1001, as show in FIG. 11b. In other words, the first participant input received at the web page 1001 displayed on the first participant's computing device 110 may manipulate both the browser 132 in the first participant's computing device 110 and the browser 142 in the second participant's computing device 120, so that both browser 132 and 142 can navigate to the new web page 1101, in almost real time.

At 907, the first and second participants' interactions with the shared content item may be collected and tracked by the multichannel processing engine 108 and saved to the customer relationship management subsystem 104 based on the participants' ID information and become the participants' profile information. The interactions may be, e.g., their viewed the web pages 1001 and 1101.

The process may then return to 904.

At the same time, when a second participant input on the browser window 1150 is detected at 914, the co-browsing module 109 may capture the second participant input, and send it to the browser 132 in the first participant's computing device 110 at 915.

At 916, the browser 142 in the second participant's computing device 120 may respond to the second participant input. In one example, the second participant input may be a gesture to move the web page 1101 in the browser window 1150 up. As shown in FIG. 12b, the web page 1101 is moved up, and a new screen 1201 is shown in the browser window 1250.

Figure 12A:
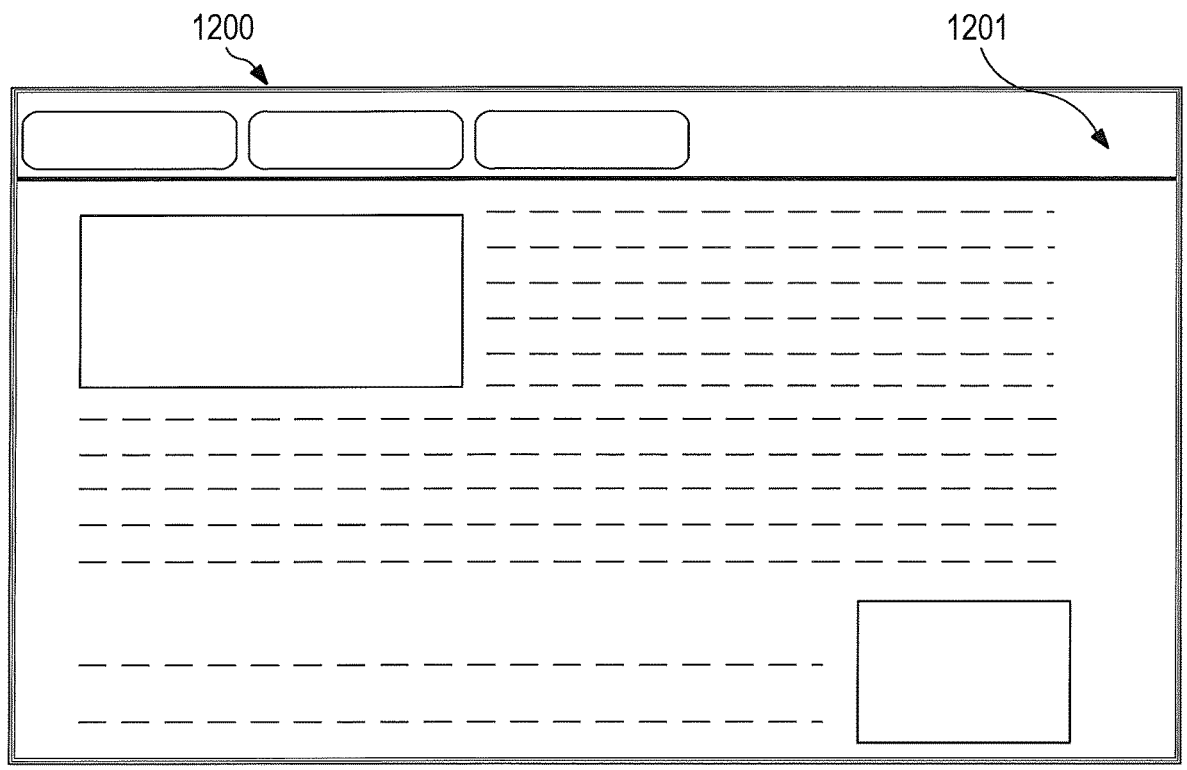
FIGS. 12a and 12b each illustrates a screenshot showing one embodiment of a user interface during a co-browsing session.
Figure 12B:
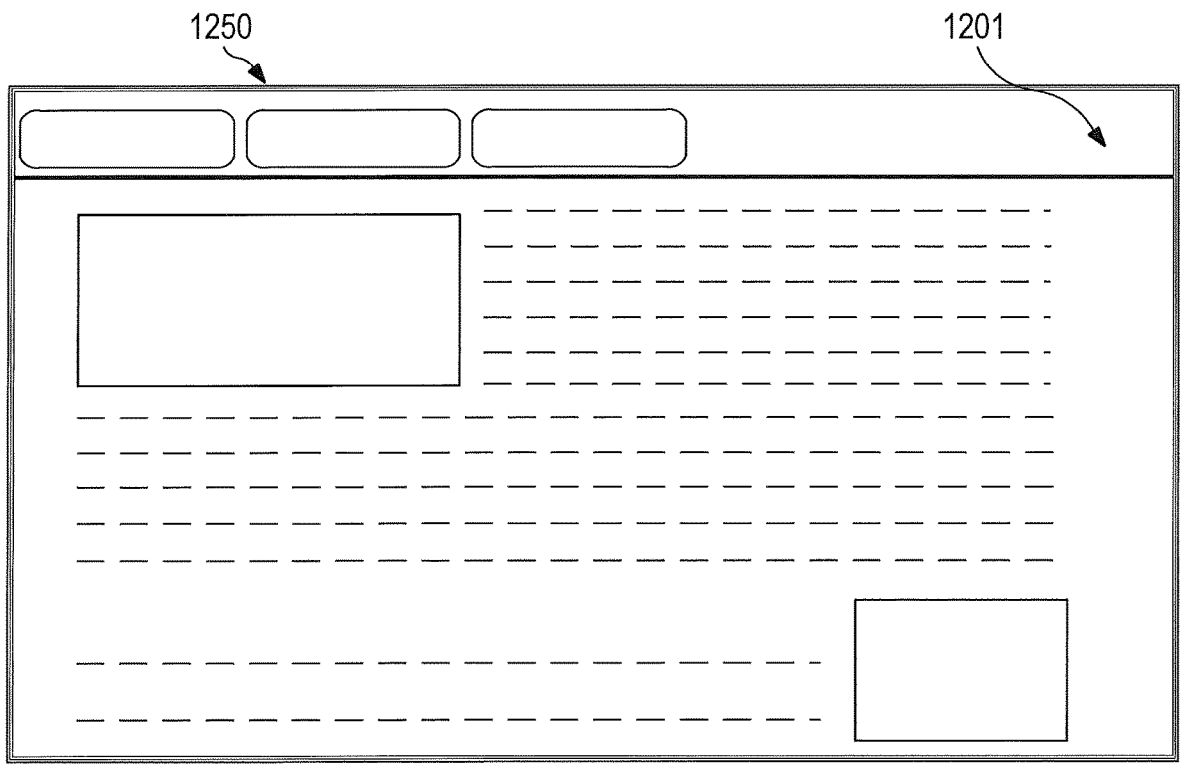

Meanwhile, at 906, when the second participant input, e.g., the gesture to move the web page 1101 up, is received at the browser 132 in the first participant's computing device 110 from the co-browsing module 109, it may be displayed on the web page 1101 in the browser window 1100 at the same location of the gesture on the web page 1101 in the browser window 1150, and the web page 1101 in the browser window 1100 may be moved up, as show in FIG. 12a, as if the second participant input is received locally at the first participant's computing device 110. Accordingly, the second participant input received at the browser window 1150 on the second participant's computing device 120 may manipulate both the browser 132 in the first participant's computing device 110 and the browser 142 in the second participant's computing device 120, so that both browser 132 and browser 142 can move the web page 1101 up, in almost real time and for almost the same distance.

At 917, the first and second participants' interactions with the shared content item may be collected and tracked by the multichannel processing engine 108 and saved to the customer relationship management subsystem 104 based on the participants' ID information and become the participants' profile information. The interactions may be, e.g., their moved the webpage 1101 up.

The process may then return to 914.

Consequently, the first and second participants can see both participants' input on the shared content item in almost real time, and the two browsers 132 and 142 may respond to participants' input, both local input and input from the co-browsing module 109 over the network. By collecting the first participant input in the first browser, transferring it to the second browser, and manipulating the second browser with the transferred first participant input, the co-browsing of the present invention allows the participants to share a browsing session in almost real time.

In addition to web pages, the co-browsing of the present invention may be used to present image and video. Participants have the video stream from a same source coming in their own browsers respectively, and all can control when the video stream starts, stops, or moves to a different part. Since for each participant, the video plays locally. It is very smooth and there is no lag. The co-browsing of the present invention may also be used in real time communication in text (e.g., Chat).

The co-browsing of the present invention is browser based and relies on HTML and JavaScript. It does not require the participants to install a plug-in, an application, flash, or other additional software. It is very light weight, and works well on mobile devices. It is also far more flexible, cheaper and faster than remote desktop solutions. In addition, compared to transferring the first participant's screen image to the second participant, the co-browsing of the present invention does not overburden the user computing devices and the network, and user experience can be significantly improved.

Figure 13:
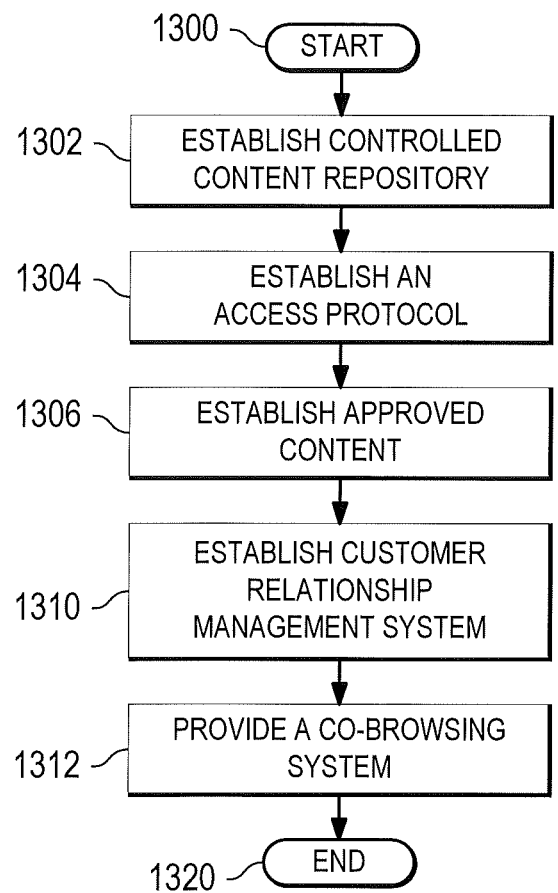
FIG. 13 is a flowchart illustrating the providing and/or provisioning of a co-browsing system.

FIG. 13 is a flowchart illustrating the building and/or provisioning of exemplary elements of a co-browsing system in accordance with the embodiments disclosed in the present application. The method starts and block 1300, after which the system builders and/or administrators establish a controlled content repository 102 at block 1302. As described herein, the controlled content repository is designed to be securely and controllably accessed such that only authorized users can build the controlled content therein. To ensure the integrity and security of the controlled content repository 102, an access protocol is established at block 1304. The access protocol may be defined by computer instructions stored in the computer readable memory or executable code storage 120. By the computer instructions stored therein, the multichannel processing engine 108 is thereby able to control access to the controlled content repository 102 in accordance with the principles described in the present application.

At block 1306, one or more users establish approved content to be stored in the controlled content repository 102 under the control of the access protocol established at block 1304 (or as that protocol is later changed or updated). At block 1308, a customer relationship management system is accessed such that the requests for co-browsing can be addressed to customer contacts of the enterprise or salesperson for the enterprise who is engaging in the marketing, manufacturing, clinical trials, or other activity described herein. At block 1310, the actual co-browsing system is provided that interfaces with the approved content, the access protocol, and/or the customer relationship management system. This co-browsing system, or more specifically the multichannel processing engine 108, is accessed by senders of co-browsing requests as described in the present application.

It should be appreciated that as previously discussed, the customer relationship management system 104/106 may be further operable to communicate with multiple sources of information to build a current and accurate collection of information regarding customer accounts. It should also be appreciated that to facilitate such communications, at least one of the multiple sources of information that might communicate with the custom relationship management system 104/106 may communicate with external servers that belong to one or more third-party partners or agencies through an Application Programming Interface ("API") whereby the customer relationship management system can flexibly receive data updates from the one or more third-party partners or agencies. The access protocol that is established may also include a set of alignment rules that determine specific pieces of approved content that are available to the selected customers from the controlled content repository.

While FIG. 13 is described in basic terms regarding its general operation as a controlled content access system, it should be appreciated that such a system is described herein with multiple specific implementations. Such specific implementations can be facilitated through front-end applications in the context of supporting research, development, and initial clinical trial submissions as previously described. Other front-end applications as previously described include manage access and/or distribution of trial documents and reports in support of ongoing clinical trials, materials control and/or manufacturing process controls, communications with medical facilities in support of medical facility operations, and the development and distribution of promotional materials as related to regulatory restricted products such as prescription drugs.

To facilitate the compliance with government regulation, a regulatory compliance engine can be provided to review content and the access protocols and to ensure that only approved content authored by properly authorized individuals and according to required controls can be distributed to permitted possible customers or other content recipients in accordance with government regulations.

While various embodiments have been described above, it should be understood that they have been presented by way of example only, and not limitation. The flowcharts do not mean to limit the sequence of the steps. Thus, the breadth and scope of a preferred embodiment should not be limited by any of the above described exemplary embodiments, but should be defined only in accordance with the claims and their equivalents for any patent that issues claiming priority from the present provisional patent application.

For example, although the embodiments are described with a customer relationship management subsystem 104, the customer information and content may be from other types of information management systems, e.g., a Closed Loop Marketing (CLM) system. In addition, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A machine-implemented method for co-browsing; the method comprising:
    establishing a controlled content repository, the controlled content repository being securely and controllably accessed;
    establishing an access protocol for the controlled content epository, whereby approved content is stored in the controlled content repository according to the access protocol and whereby the access protocol comprises at least one set of alignment rules;
    storing the approved content within the controlled content repository, the approved content further being accessible according to the established access protocol;
    aligning the approved content within the controlled content repository with information from an information management system;
    collecting a first participant input on a first item of approved content displayed in a first browser in a first end user device; wherein the first participant input is used to manipulate the first browser to generate a first screen on the first end user device in response to the first participant input;
    manipulating the first browser to generate the first screen on the first end user device locally in response to the first participant input;
    transferring the first participant input; instead of the first screen generated on the first end user device in response to the first participant input, to a second browser in a second end user device over a network; and
    enabling the second browser to respond to the first participant input to generate the first screen locally and directly on the second end user device, without depending on data generated in response to the first participant input on the first end user device from the first end user device or from a server.

2. The method of claim 1, further comprising: receiving a request for a co-browsing session and displaying a user interface for generating the co-browsing session in response.

3. The method of claim 2, further comprising: receiving identity information of the second participant at the user interface for generating the co-browsing session.

4. The method of claim 3, further comprising: receiving information of the first item of approved content at the user interface for generating the co-browsing session.

5. The method of claim 4, further comprising: accessing the controlled content repository and the information management system to determine if the first item of approved content can be made available to the second participant in accordance with a limitation in the information management system.

6. The method of claim 5, wherein the limitation in the information management system comprises: a regulatory limitation related to the second participant, profile information of the second participant, and preferences of the second participant.

7. The method of claim 5, further comprising: generating identifier of the co-browsing session.

8. The method of claim 7, wherein the identifier of the co-browsing session is a Uniform Resource Locator ("URL") of the first item of approved content.

9. The method of claim 7, further comprising: generating a first security token for the first participant, and generating a second security token for the second participant.

10. The method of claim 9, further comprising: adding the first security token to the identifier of the co-browsing session to generate a first co-browsing invitation for the first participant; and adding the second security token to the identifier of the co-browsing session to generate a second co-browsing invitation for the second participant.

11. The method of claim 10, further comprising: sending the first co-browsing invitation to the first participant, and sending the second co-browsing invitation to the second participant.

12. The method of claim 11, wherein the second co-browsing invitation is sent via a Short Message, an Instant Message, an email or a phone call.

13. The method of claim 12, wherein the second security token consists of numeric digits only.

14. The method of claim 1, wherein the information management system is a customer relationship management (CRM) system or a closed loop marketing (CLM) system.

15. The method of claim 1; further comprising: updating the second participant's profile information in the information management system with the co-browsing session information.

16. The method of claim 1, wherein the controlled content repository is adapted to provide development and distribution of promotional materials as related to regulatory restricted products.

17. The method of claim 16, wherein the regulatory restricted products are prescription drugs.

18. The method of claim 1, wherein the first item of approved content is accessed from a Content Delivery Network ("CDN").

* * * * *